United States Patent [19]
Wilhelm et al.

[11] Patent Number: 5,703,916
[45] Date of Patent: Dec. 30, 1997

[54] APPARATUS AND METHOD FOR LOOSENING A STUCK REACTOR VESSEL STUD

[75] Inventors: John J. Wilhelm, New Kensington, Pa.; Herman Schemberger, Lune, Germany

[73] Assignee: Westinghouse Electric Corporation, Pittsburgh, Pa.

[21] Appl. No.: 566,033

[22] Filed: Dec. 1, 1995

[51] Int. Cl.$^6$ .................................................. G21C 19/00
[52] U.S. Cl. ...................... 376/260; 81/53.2; 29/DIG. 46
[58] Field of Search ............................. 376/260, 310; 81/53.2, 57.38; 29/240, 254, 426.5, 723, DIG. 46; 254/29 A, 93 A; 134/22.18, 166 C

[56] References Cited

U.S. PATENT DOCUMENTS

| | | | |
|---|---|---|---|
| 3,861,250 | 1/1975 | Zugai | 81/464 |
| 4,223,575 | 9/1980 | Krueger | 81/57.38 |
| 4,241,795 | 12/1980 | Landry, Jr. | 173/90 |
| 4,535,656 | 8/1985 | Orban | 81/57.38 |
| 4,548,103 | 10/1985 | Orban | 81/53.2 |
| 5,249,208 | 9/1993 | Ruzga et al. | 376/260 |
| 5,579,567 | 12/1996 | Acevedo | 29/254 |

Primary Examiner—Daniel D. Wasil

[57] ABSTRACT

Apparatus and method for loosening a stuck reactor pressure vessel stud. A nuclear reactor pressure vessel has a threaded blind bore therein receiving an upright threaded stud having a centrally disposed passage longitudinally therethrough. A pulsar pump is in communication with the passage for supplying a pulsating liquid into the passage and thence into the bore. As the fluid exits the passage, it will push against the bottom of the bore and exert an upwardly directed hydraulic force against the end of the stud for upwardly lifting the stud. A controller is connected to the pulsar pump for controllably operating the pulsar pump. As the hydraulic force of the pulsating fluid lifts the stud, the fluid will migrate between the threads of the stud and the bore for peening or removing any debris from therebetween and washing it upwardly between the stud and bore to a suction pump in communication with the bore. The suction pump suctions the debris-containing liquid from the bore. The apparatus includes a rotation tool connected to the stud for rotating the stud as the liquid is pulsed in order to enhance removal of the debris from the threads. Removal of the debris allows the stud to rotate with reduced resistance to rotation and with the normal amount of torque applied thereto.

23 Claims, 6 Drawing Sheets

APPARATUS AND METHOD FOR LOOSENING A STUCK REACTOR VESSEL STUD

BACKGROUND

This invention generally relates to apparatus and methods for servicing nuclear reactor pressure vessels and more particularly relates to an apparatus and method for loosening a stuck reactor pressure vessel stud.

A typical nuclear reactor pressure vessel includes a shell having an open top end and a shell flange surrounding the open end of the shell. A hemispherical closure head caps the open end of the shell, the closure head having a closure head flange surrounding the perimeter of the closure head. The closure head flange and the shell flange are coaxially aligned and attached together by a plurality of externally threaded, spaced-apart, upright studs. Each stud extends through its respective smooth hole formed through the closure head flange and thence into an internally threaded blind bore in the shell flange. A threaded nut is threadably run-down each of the studs and is tightened against the top of the closure head flange for securing the closure head to the shell. In order to service the interior of the reactor, the closure head is removed by unthreading the nuts from the studs, unthreading the stud from its respective threaded bore in the shell flange and then upwardly sliding the stud from the smooth bore in the closure head flange. After the interior of the reactor is serviced, lubricant (e.g., an alcohol-containing or oil-based liquid lubricant) is applied to the threads of the bore and the threads of the stud in order to assist in threading the stud back into the bore as the closure head is remounted on the shell.

However, applicant has observed that during the typical 18 month operation of the reactor, the previously mentioned lubricant may "dry-out" and harden due to the elevated temperatures of the reactor vessel wall. The lubricant will tend to "dry-out" and harden because the relatively high temperature of the vessel wall vaporizes the alcohol of the alcohol-based lubricant or carbonizes the oil-based lubricant thereby leaving a dry "concrete-like" sediment or debris remainder between the threads of the blind bore and stud. Moreover, if the stud threads were damaged (e.g., pitted) during previous maintenance operations, then the presence of the debris will tend to adhere to the damaged locations of the stud threads and thereafter gall (i.e., scratch and tear) the surface of the threads when it is attempted to subsequently unthread the stud from the blind bore during future servicing of the reactor interior. Such galled threads will cause the stud to become stuck and resist unthreading from the threaded bore. That is, the hardened debris and galled threads make it more difficult and sometimes impossible to unthread the stuck reactor vessel stud merely by turning the stud with a normal amount of torque.

One prior art solution to the problem of a stuck reactor vessel stud is simply to turn the stud with an extremely high torque in order to force the stud free. However, applicant has observed that this "brute force" method of removal of a stuck stud may result in further galling and pitting of the stud threads due to the continued presence of the hardened debris between the threads of the stud and the bore. Moreover, applicant has observed that sometimes the only practical way to remove the stud from the bore is to drill-out the stud from the bore, a time-consuming and costly process. To drill-out a stuck stud may cost up to $300,000 per stud and will delay returning the reactor to power.

Therefore, a problem in the art is to provide an apparatus and method for loosening a stuck reactor vessel stud without further galling the stud and avoiding the need to drill-out the stud.

SUMMARY OF THE INVENTION

Disclosed herein are an apparatus and method for loosening a stuck reactor pressure vessel stud. A nuclear reactor pressure vessel has a threaded blind bore therein receiving an upright threaded stud having a centrally disposed passage longitudinally therethrough. A pulsar pump is in communication with the passage for supplying a pulsating liquid into the passage and thence into the bore. As the fluid exits the passage, it will push against the bottom of the bore and exert an upwardly directed hydraulic force against the end of the stud for upwardly lifting the stud. A controller is connected to the pulsar pump for controllably operating the pulsar pump. As the hydraulic force of the pulsating fluid lifts the stud, the fluid will migrate between the threads of the stud and the bore for peening or removing any debris from therebetween and washing it upwardly between the stud and bore to a suction pump in communication with the bore. The suction pump suctions the debris-containing liquid from the bore. The apparatus includes a rotation tool connected to the stud for rotating the stud as the liquid is pulsed in order to enhance removal of the debris from the threads. Removal of the debris allows the stud to rotate with reduced resistance to rotation and with the normal amount of torque applied thereto.

The invention in its broad form is, for use in association with a nuclear vessel having a threaded bore therein and a threaded stud threadably engaging the bore, the stud resisting rotating thereof, an apparatus for reducing the resistance of the stud to rotation, comprising stud vibration means in communication with the stud for vibrating the stud; and support means connected to said stud vibration means for supporting said stud vibration means.

The invention in its broad form is also, for use in association with a nuclear vessel having a threaded bore therein and a threaded stud threadably engaging the bore, the stud resisting rotation thereof, a method of reducing the resistance of the stud to rotation, comprising the step of vibrating the stud.

An object of the present invention is to provide an apparatus and method for loosening a stuck reactor pressure vessel stud in a manner that obviates the need to use a "brute force" method of stud removal and that also obviates the need to drill-out the stuck stud.

A feature of the present invention is the provision of fluid pulsating supply means in communication with the bore for supplying a pulsed fluid into the bore to lift the stuck stud.

Another feature of the present invention is the provision of stud rotation means in combination with the fluid pulsating means for rotating the stud as the stud is lifted, so that the stuck stud is freed from its stuck condition.

An advantage of the present invention is that further galling of the stuck stud is avoided because the "brute force" method of removing the stuck stud is not used.

Another advantage of the present invention is that the increased costs and delay associated with drilling-out the stuck stud is avoided by use of the invention.

These and other objects, features, and advantages of the present invention will become apparent to those skilled in the art upon a reading of the following detailed description when taken in conjunction with the drawings wherein there is shown and described illustrative embodiments of the invention.

BRIEF DESCRIPTION OF THE DRAWINGS

While the specification concludes with claims particularly pointing out and distinctly claiming the subject matter of the invention, it is believed the invention will be better understood from the following description taken in conjunction with the accompanying drawings wherein:

DESCRIPTION OF THE PREFERRED EMBODIMENTS

Figure 1:
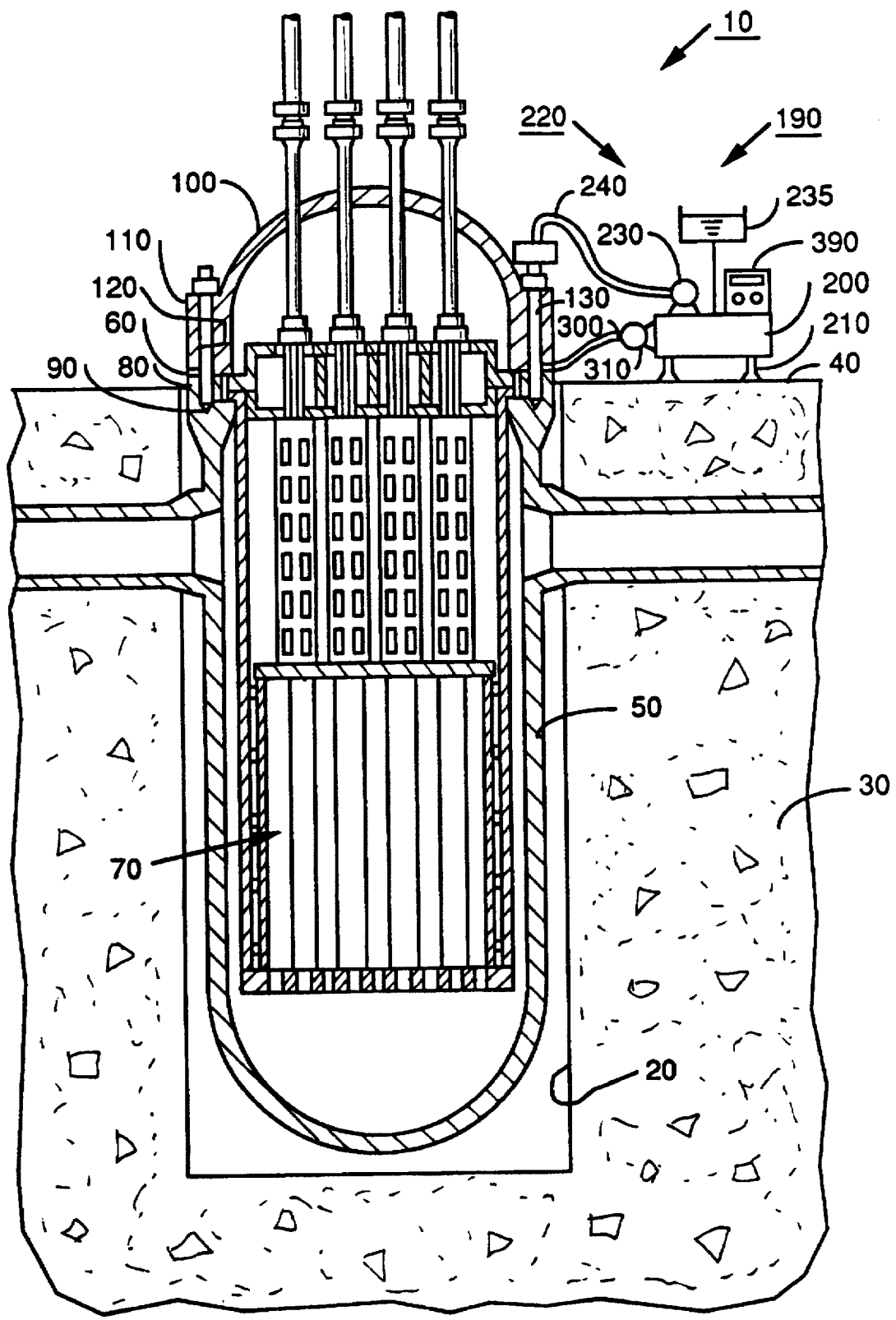
FIG. 1 is a view in partial vertical section of a typical Pressurized Water Reactor (PWR) pressure vessel having a lower shell portion and a closure head portion secured to the shell portion by a threaded reactor vessel stud stuck against rotation in a threaded bore formed in the lower shell portion, this view also showing the apparatus of the invention disposed nearby for loosening the stuck stud by supplying a pulsating fluid to the bore.
Figure 2:
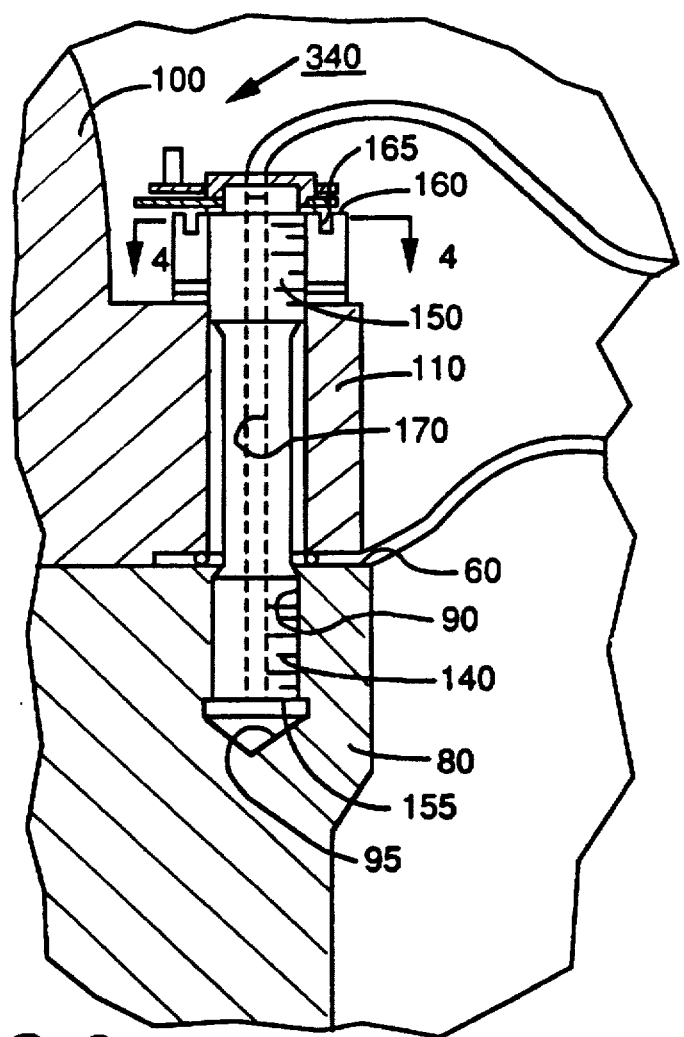
FIG. 2 is a view in partial vertical section of the stud stuck in the bore.

Referring to FIGS. 1 and 2, there is shown a nuclear reactor pressure vessel, generally referred to as 10, disposed in a reactor cavity 20 defined by a containment structure 30. Containment structure 30 includes an annular ledge 40 surrounding cavity 20 in order to provide a work platform for equipment and service personnel. Pressure vessel 10 includes a pressure vessel shell 50 having an open top end 60 for allowing access to internal components, generally referred to as 70, disposed in shell 50. A pressure vessel shell flange 80 surrounds open top end 60 of shell 50, flange 80 having a plurality of spaced-apart threaded blind bores 90 formed therein. Each blind bore 90 terminates in a cavity 95.

Still referring to FIGS. 1 and 2, capping open top end 60 is a hemispherical closure head 100. A closure head flange 110 surrounds the perimeter of closure head 100, closure head flange 110 having a plurality of spaced-apart smooth holes 120 therethrough coaxially aligned with respective ones of bores 90. Extending through each hole 120 and threadably received into its respective bore 90 is an elongate stud 130. Each stud 130 has an externally threaded proximal end portion 140 and an externally threaded distal end portion 150. The threads of proximal end portion 140 threadably engage the threads of bore 90. A gap 152 is defined between proximal end portion 140 and vessel shell flange 80 as the threads of proximal end portion 140 threadably engage the threads of bore 90, the gap 152 being in communication with cavity 95 (see FIG. 9). Moreover, as shown in FIGS. 1 and 2, proximal end portion 140 has a downwardly-facing end surface 155 disposed adjacent or capping cavity 95. Threadably engaging distal end portion 150 of each stud 130 is an internally threaded nut 160 capable of being run-down stud 130 and intimately engaging the top surface of closure head flange 110 for attaching closure head 100 to open top end 60 of shell 50. Nut 160 may include at least two grooves 165 in the top surface thereof for receiving a nut turning tool (not shown). It is understood from the description hereinabove that the terminology "proximal end portion" is defined herein to mean that end portion nearer to the floor of cavity 20 and the terminology "distal end portion" is defined herein to mean that end portion farther away from the floor of cavity 20.

Figure 3:
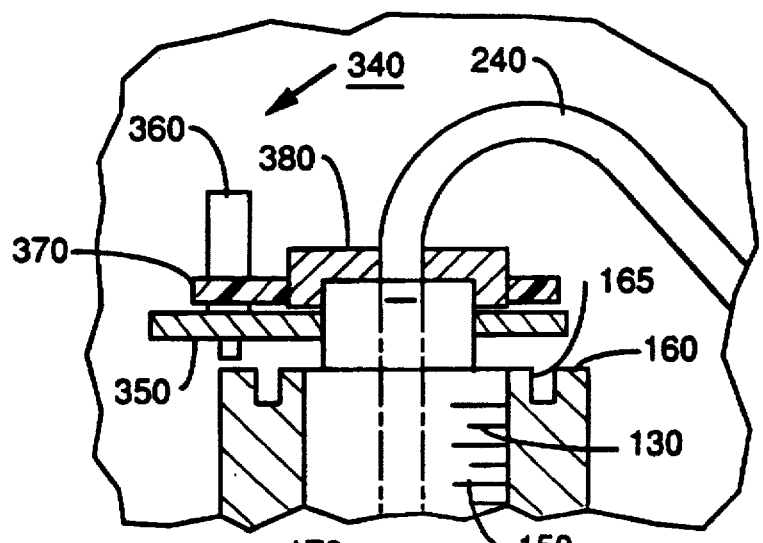
FIG. 3 is a view in partial vertical section of a rotation tool mounted on the stud for turning the stud.
Figure 4:
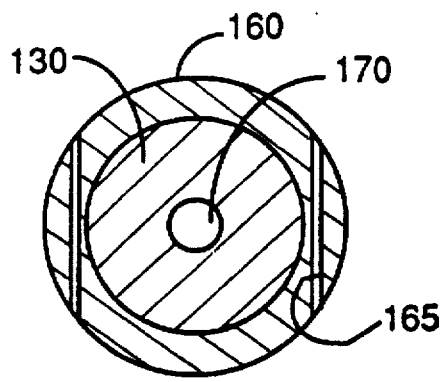
FIG. 4 is a view taken along section line 4—4 of FIG. 2.

Referring to FIGS. 2, 3 and 4, elongate stud 130 usually has a pre-existing passage 170 longitudinally therethrough for receiving an elongate gage (not shown) used for measuring the amount of tensioning of stud 130. In this regard, a stud tensioning device (not shown), which forms no part of the present invention, is used to tension stud 130 prior to nut 160 being run-down stud 160. Tensioning of stud 130 allows for intimate engagement of nut 160 with the top surface of closure head flange 110 in order to securely attach closure head 100 to vessel shell 50. Such an elongate gage is inserted into passage 170 to determine the amount of tensioning of stud 130. More specifically, the gage is inserted into passage 170 to measure the distance, before and after tensioning, between the top of the stud and an elongation rod (not shown), which is also positioned in passage 170, to determine the amount of tensioning of stud 130. As described in detail hereinbelow, the advantageous presence of passage 170 will be used to assist in loosening stuck stud 130.

Figure 5:
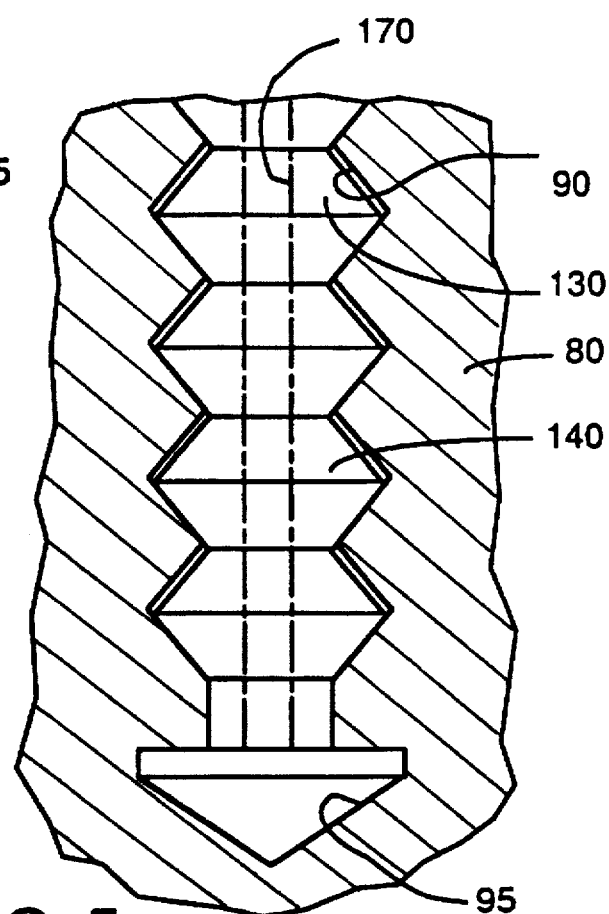
FIG. 5 is a fragmentary view in partial vertical section of the stud threadably engaging the threads of the bore before the stud loosening process is begun.
Figure 6:
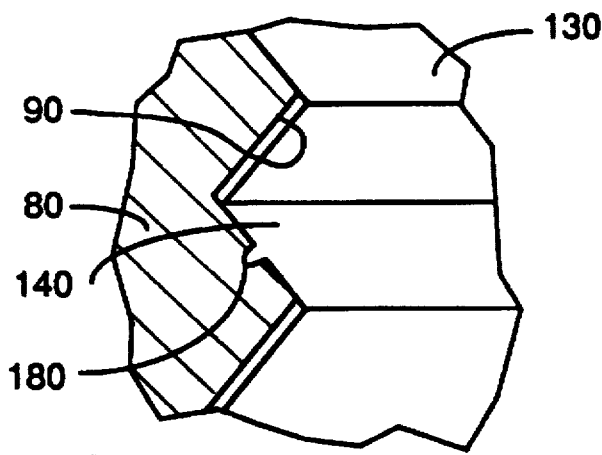
FIG. 6 is a fragmentary view in partial vertical section of the stud having a canker thereon resulting from previous galling of the stud in the bore.

Referring to FIGS. 5 and 6, proximal end portion 140 of stud 130 is there shown threadably engaging bore 90 prior to use of the invention. There may be a plurality of outwardly projecting burrs or cankers 180 (only one of which is shown) integrally attached to the exterior of stud 130 and penetrating the surface of the threads of bore 90 causing stud 130 to gall or stick when rotation thereof is attempted.

Returning now to FIG. 1, there is shown the subject matter of the present invention, which is an apparatus, generally referred to as 190, for loosening stuck stud 130. Apparatus 190 comprises support means, such as an adjustable support platform 200, for reasons disclosed presently. Support platform 200 includes a plurality of adjustable feet 210 resting on ledge 40, which adjustable feet 210 are capable of raising or lowering the elevation of support platform 200 for conveniently working on stud 130. Apparatus 190 further comprises stud vibration means, generally referred to as 220 in communication with stud 130 for vibrating stud 130, so that stuck stud 130 is capable of being loosened and thereby capable of rotating substantially resis- tance-free during or after vibration of stud 130. As described in detail presently, vibration means 220 may be hydraulic vibration means. More specifically, vibration means 220 preferably comprises fluid pulsating supply means, such as a fluid supply pulsar pump 230 supported by support platform 200 for supplying a pulsating fluid (e.g., demineralized water or oil) into passage 170 and thence into cavity 95 to oscillate or vibrate (e.g., repeatedly upwardly translate or lift) stud 130. Fluid supply pump 230 will preferably pulse the fluid at a frequency of between approximately one and ten pulses per second. Fluid pulsating supplying means further comprises a fluid supply reservoir 235 connected to fluid supply pump 230 for supplying the fluid to fluid supply pump 230. Fluid pulsating supply means also comprises a flexible first conduit 240 that extends from fluid supply pump 230 and into passage 170 for supplying the pulsed fluid into passage 170. The pulsed fluid will flow downwardly through passage 170 and into cavity 95 to fill passage 170 and cavity 95.

Figure 7:
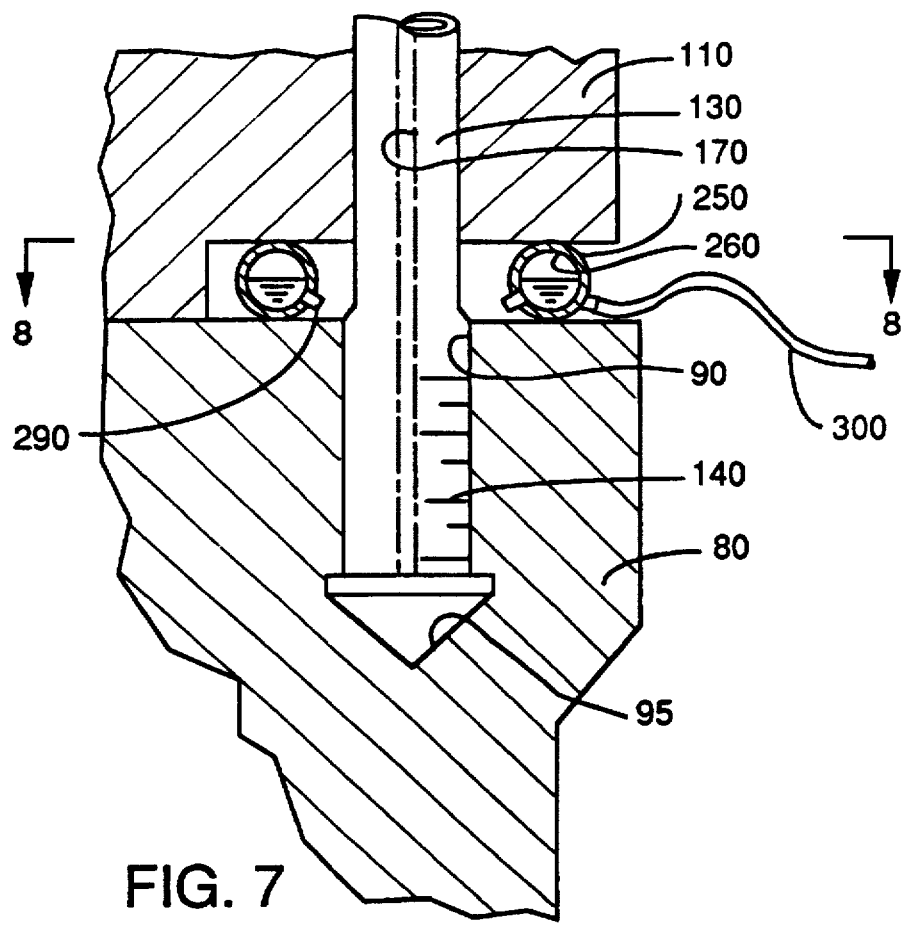
FIG. 7 is a view in vertical section of a fluid collection reservoir for suctioning and then collecting the fluid from the bore as the stud is loosened.
Figure 8:
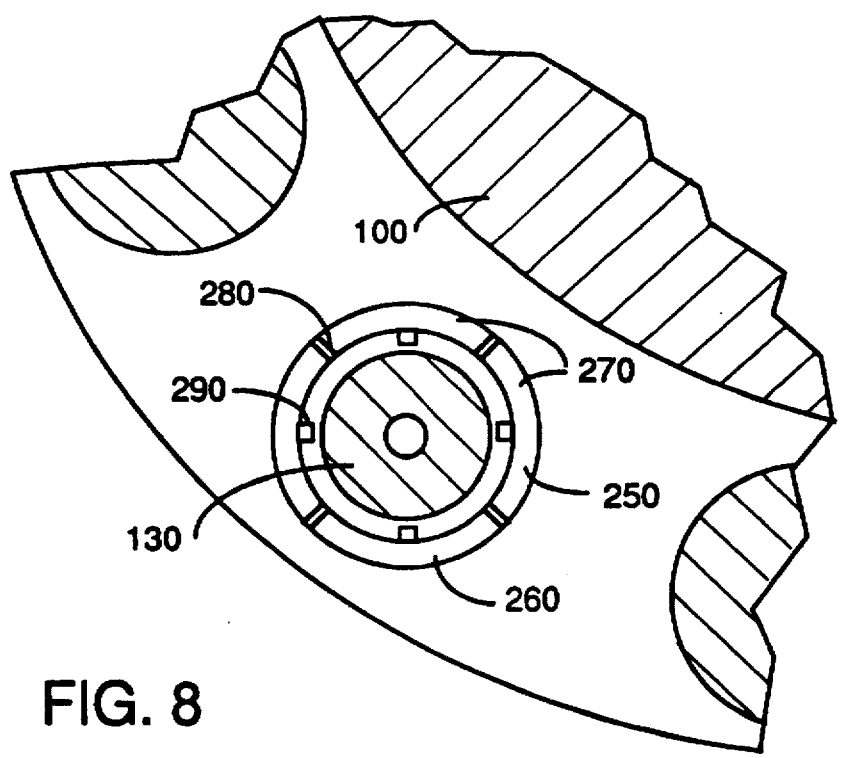
FIG. 8 is a view taken along section line 8—8 of FIG. 7.

As best seen in FIGS. 1, 7, and 8, apparatus 190 further comprises suction means in communication with bore 90 for generating suction in bore 90. The suction means comprises a segmented torus-shaped collection reservoir 250 surrounding the mouth of bore 90 and resting on the top surface of shell 60, collection reservoir 250 defining a chamber 260 therein for collecting fluid suctioned from bore 90. Collection reservoir 250 necessarily includes a plurality of segments 270 sealably joined or locked together by locking joints 280 respectively interposed between adjacent segments 270. The segmented construction of collection reservoir 250 allows for placement and removal of collection reservoir while stud closure head 100 remains in place. Collection reservoir 250 may further include a plurality of suction spouts 290 projecting inwardly toward the mouth of bore 90 for suctioning thereinto the fluid exiting the mouth of bore 90, as described more fully presently. Each spout 290 may include a one-way flapper flow valve (not shown) operable to prevent the liquid from flowing out of chamber 260 once the liquid flows through spout 290 and enters chamber 260. A flexible second conduit 300 has an end thereof in communication with chamber 260 and the other end thereof connected to a suction pump 310, which may be attached to support platform 200. The fluid once suctioned into collection reservoir 250 is disposed of in the manner customarily reserved for disposal of liquid radioactive waste, if required.

Figure 9:
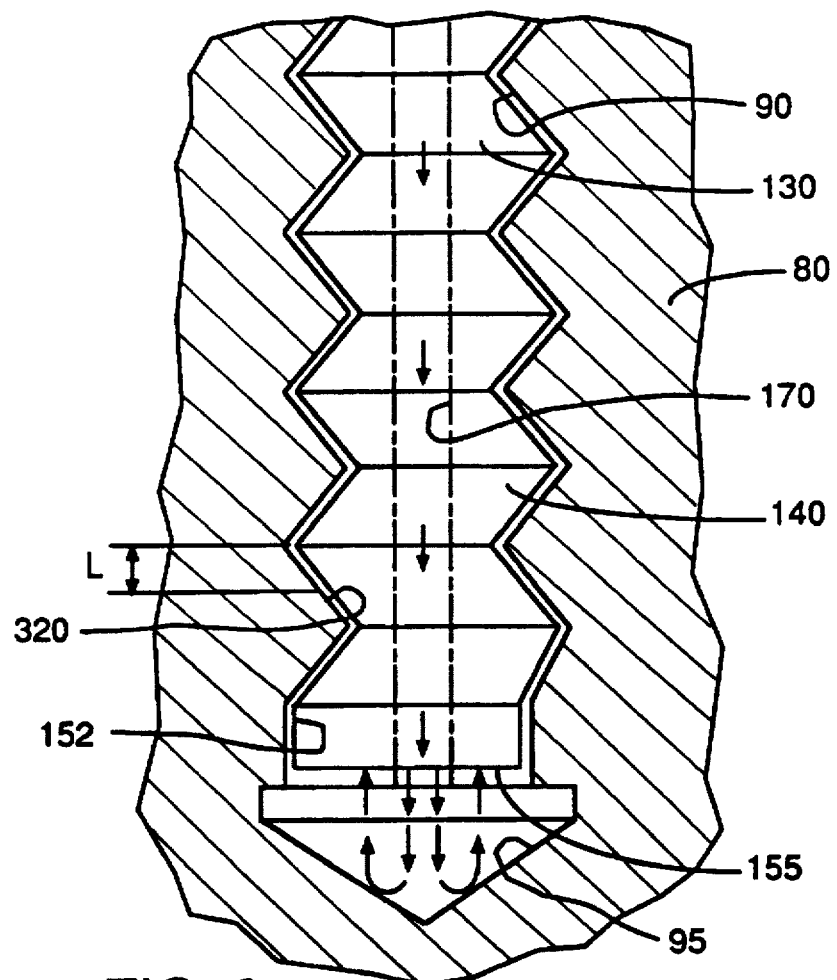
FIG. 9 is a fragmentary view in partial vertical section of the stud lifted an intermediate predetermined distance in the bore by pulses of the fluid acting against the lower end of the stud.
Figure 10:
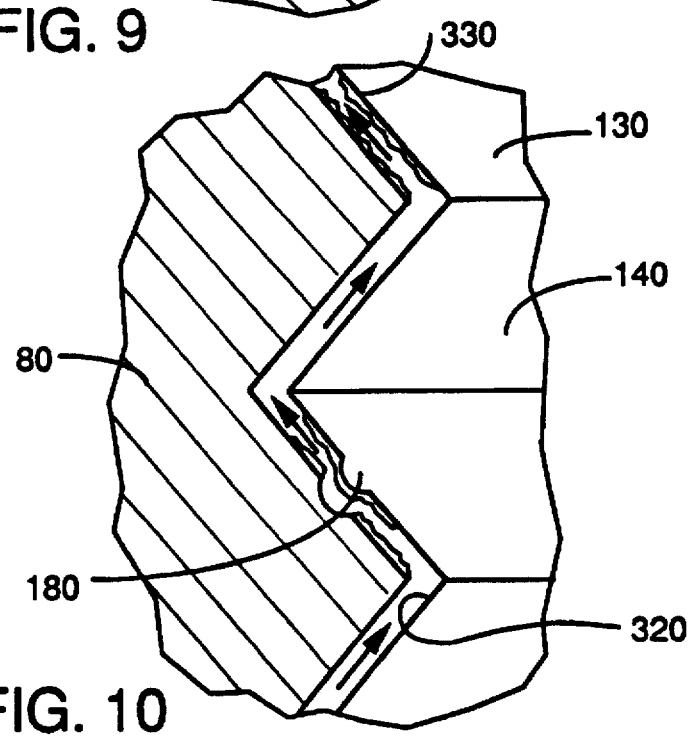
FIG. 10 is a fragmentary view in partial vertical section of the stud lifted the previously mentioned predetermined intermediate distance in the bore, this view also showing debris as well as the canker residing between the threads of the bore and the stud.

Turning now to FIGS. 9 and 10, fluid supply pump 230 supplies pulsed fluid, preferably at a frequency of between approximately one and ten pulses per second, downwardly through passage 170 and into cavity 95 to fill passage 170 and cavity 95. As the fluid is pulsed by fluid supply pump 230, the fluid in cavity 95 will impinge against end surface 155 of stuck stud 130 and will exert an upwardly-directed hydraulic force acting against end surface 155. The upwardly directed force of the fluid will lift stud 130 a predetermined intermediate distance "L" in bore 90 as the hydraulic force acts against end surface 155 of stud 130. In this manner, the weight of stud 130 is lifted from the surface of the threads of bore 90, to assist in freeing stud 130 from its stuck condition.

Figure 11:
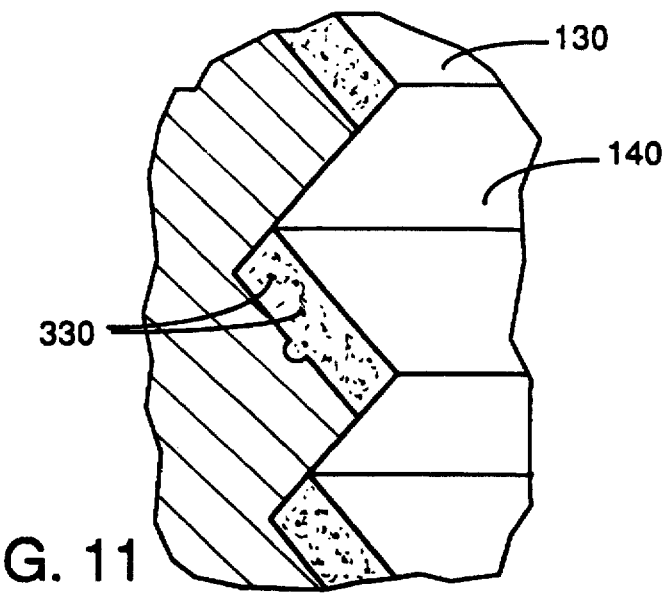
FIG. 11 is a fragmentary view in partial vertical section showing the stud threads lifted in the bore to the previously mentioned maximum predetermined distance, this view also showing the debris being removed from the stud threads by the pulsing action of the hydraulic fluid and further showing that the canker has been reduced to debris by peening action.

As best seen in FIGS. 10 and 11, debris 330 resides between the threads of stud and bore 90. This debris 330 may be hardened dried-out lubricant residue adhering to the surfaces of the threads of bore 90 and/or the threads of stud 130. Such hardened concrete-like debris may interfere with or even prevent rotation of stud 130 in bore 90. In this sense, stud 130 will be stuck in bore 90. However, the pulsed fluid flowing between the threads of stud 130 and the threads of bore 90 will have sufficient hydraulic force to loosen any debris 330 and to peen away any cankers 180 in order to free stud 130 from its stuck condition. In this regard, the fluid in cavity 95 will migrate through the previously mentioned gap 152 and thereafter travel the spiral stair-like interstitial space 320 defined between the threads of stud 130 and the threads of bore 90. The flow path of the fluid is illustrated generally by the arrows in FIG. 10. Continued pulsing of the fluid will allow the fluid to forceably upwardly migrate the length of space 320 and out the mouth of bore 90 to be suctioned through spouts 290 and into chamber 260 defined by collection reservoir 250. The hydraulic fluid can then be disposed of in the manner customarily used in the art.

Figure 12:
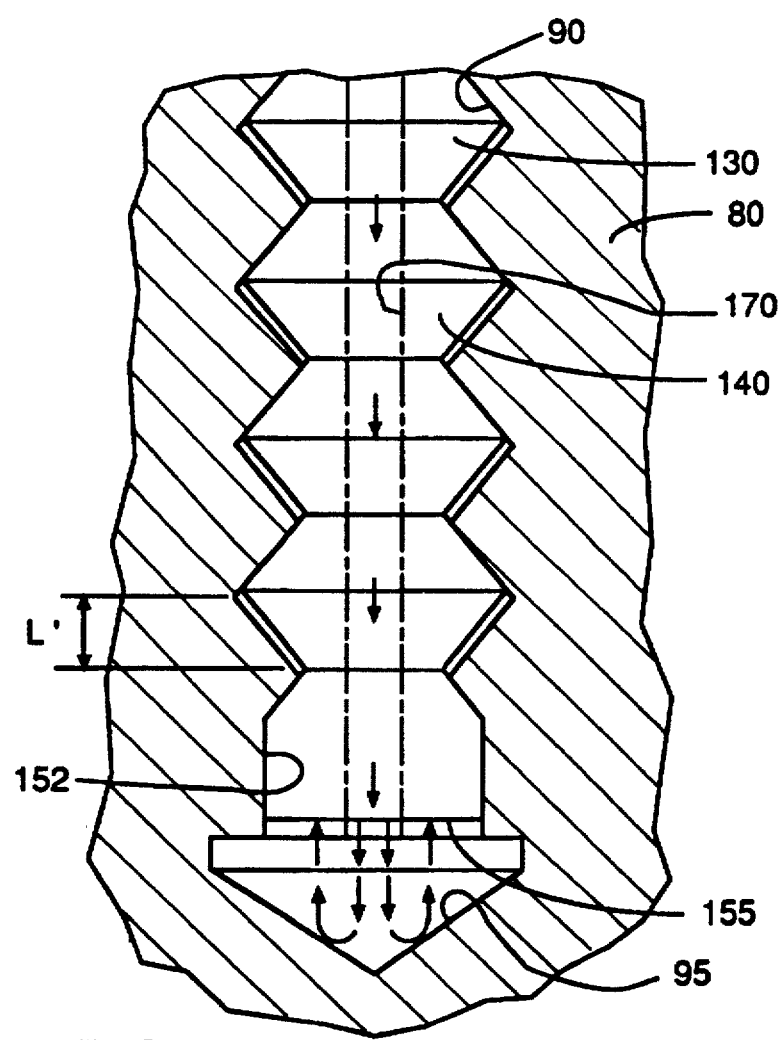
FIG. 12 is a fragmentary view in partial vertical section showing the stud threads lifted a maximum predetermined distance in the bore by the hydraulic force of the fluid acting against the lower end of the stud.

As illustrated in FIG. 12, the hydraulic force exerted against end surface 155 during pulsing of the fluid will further upwardly translate stud 130, if desired, to a maximum predetermined distance L'. Between pulses, stud 130 will tend to fall by gravity preferably to its initial position as shown in FIG. 5, whereupon the fluid is pulsed again to lift stud 130.

Returning now to FIGS. 1, 2 and 3, apparatus 190 may further comprise rotation means, such as a stud rotation tool, generally referred to as 340, removably connected to the distal end 150 of stud 130 for rotating stud 130 as fluid supply pump 230 pulses the fluid. Rotating stud 130 as the fluid is pulsed will more easily free stud 130 from its stuck condition. Stud rotation tool 340 may include a support member 350 slidably connected to distal end portion 150 of stud 130 and also may include a motor 360 attached to support member 350. Rotation tool 340 may also include drive means, such as a continuous drive belt 370, surrounding a cap member 380 that is connected to distal end portion 150 of stud 130. Belt 370 is also connected to motor 360 for driving belt 370 and thus rotating cap member 380. As cap member 380 rotates, stud 130 rotates. A typical rotation tool suitable for this purpose is disclosed in U.S. Pat. No. 4,223,575 titled "Reactor Vessel Stud Turnout Tool" issued Sep. 23, 1980 in the name of William H. Krueger and assigned to the assignee of the present invention, the disclosure of which is hereby incorporated by reference. Apparatus 190 may further include control means, such as a controller 390 connected to fluid supply pulsar pump 230 for controllably operating pump 230 so that the desired frequency of pulses is obtained as stud 130 is rotated. Controller 390 may include a computer for automatically controllably operating pulsar pump 230.

By way of example only, and not by way of limitation, stud 130 may weigh approximately 800 pounds, be approximately 60 inches long and six to seven inches in diameter. Therefore, the "brute force" method of loosening stuck stud 130 is difficult or even impossible to use due to the sheer weight and size of stud 130. However, pump 230 will provide a force of approximately 1,500 pounds against end surface 155 during each pulse. This force is sufficient to lift the relatively heavy stud 130, which can then be rotated in the manner disclosed hereinabove.

It will be appreciated from the description herein-above, that an advantage of the present invention is that use thereof will avoid using a "brute force" method of removing a stuck reactor vessel stud, thereby preventing further galling and scratching of the threads of the stud.

It will be further appreciated that another advantage of the present invention is that use thereof will avoid the increased costs and delays associated with drilling-out a stuck reactor vessel stud.

Although the invention is illustrated and described herein in its preferred embodiment, it is not intended that the invention as illustrated and described by limited to the details shown, because various modifications may be obtained with respect to the invention without departing from the spirit of the invention or the scope of equivalents thereof. For example, hydraulically lifting the stud, as disclosed herein, without rotation of the stud may sufficiently loosen the stud.

Therefore, what is provided is an apparatus and method for loosening a stuck reactor pressure vessel stud.

What is claimed is:

1. For use in association with a nuclear vessel having a thread bore therein and a threaded stud threadably engaging the bore, the stud resisting rotation thereof, an apparatus for reducing the resistance of the stud to rotation, comprising:
   (a) stud vibration means in communication with the stud for vibrating the stud, including fluid pulsating supply means for supplying a pulsating fluid into the bore to vibrate the stud;
   (b) support means connected to said stud vibration means for supporting said stud vibration means.

2. The apparatus of claim 1, wherein said fluid pulsating supply means comprises a fluid supply pulsar pump.

3. The apparatus of claim 2, wherein said fluid supply pulsar pump pulses the fluid at a frequency of between approximately one and ten pulses per second.

4. The apparatus of claim 1, further comprising fluid suction means in communication with the bore for suctioning the fluid from the bore.

5. For use in association with a nuclear vessel having a threaded bore therein and a threaded stud threadably engaging the bore, the stud resisting rotation thereof, an apparatus for reducing the resistance of the stud to rotation, comprising:
   (a) stud vibration means in communication with the stud for vibrating the stud, whereby the stud is capable of being rotated with reduced resistance to rotating after the stud is vibrated, said stud vibration means including liquid pulsating supply means for supplying a pulsating liquid into the bore; and
   (b) support means connected to said liquid pulsating supply means for supporting said liquid pulsating supply means.

6. The apparatus of claim 5, wherein said liquid pulsating supply means comprises a liquid supply pulsar pump.

7. The apparatus of clam 6, wherein said liquid supply pulsar pump pulses the liquid at a frequency of between approximately one and ten pulses per second.

8. The apparatus of claim 5, further comprising liquid suction means in communication with the bore for suctioning the liquid from the bore.

9. The apparatus of claim 8, wherein said liquid suction means comprises:
   (a) a liquid collection reservoir defining a chamber therein in communication with the bore for collecting the liquid suctioned from the bore; and
   (b) a suction pump in communication with the chamber for generating suction in the chamber, so that the liquid is suctioned from the bore and into the chamber.

10. The apparatus of claim 5, further comprising liquid supply reservoir means connected to said liquid pulsating supply means for supplying the liquid to said liquid pulsating supply means.

11. The apparatus of claim 5, further comprising control means connected to said liquid pulsating supply means for controllably operating said liquid pulsating supply means.

12. The apparatus of claim 5, further comprising rotating means connected to the stud for rotating the stud.

13. For use in association with a nuclear reactor pressure vessel having a vertically-oriented blind bore therein having first threads and defining a cavity at a proximal end of the bore, the bore receiving an upright elongate stud having second threads threadably engaging the first threads and having a proximal end thereof disposed adjacent the cavity, the stud having a predetermined weight and a centrally disposed passage longitudinally therethrough in communication with the cavity, an apparatus for reducing the resistance of the stud to rotation, comprising:
   (a) liquid pulsating supply means in communication with the passage for supplying a pulsating liquid into the passage and to the cavity, said liquid pulsating supply means including a liquid supply pulsar pump capable of pulsing the liquid;
   (b) a support platform connected to said pump for supporting said pump;
   (c) liquid suction means in communication with the bore for suctioning the liquid from the bore, said suction means including:
      (i) a torus-shaped liquid collection reservoir defining a chamber therein in communication with the bore for collecting the liquid suctioned from the bore; and
      (ii) a suction pump in communication with the chamber for generating suction in the chamber, so that the liquid is suctioned from the bore and into the chamber;
   (d) a liquid supply reservoir connected to said liquid supply pulsar pump for supplying the liquid to said liquid supply pulsar pump; and
   (e) a controller connected to said liquid supply pulsar pump for controllably operating said liquid supply pulsar pump, whereby the liquid in the passage and the cavity is pulsed as the controller controllably operates the pump, whereby intermittent hydraulic force acts against the proximal end of the stud as the liquid in the cavity is pulsed, whereby the stud is lifted a predetermined distance in the bore as the hydraulic force acts against the proximal end of the stud, whereby the weight of the stud on the first threads is reduced and the liquid migrates between the first threads and the second threads as the stud is lifted, whereby the debris residing between the first threads and the second threads loosens as the liquid migrates between the first threads and the second threads, and whereby the stud is capable of being rotated with reduced resistance to rotation as the debris loosens and as the weight of the stud on the first threads is reduced.

14. The apparatus of claim 13, further comprising a rotation tool connected to the stud for rotating the stud as said pump pulses the liquid.

15. The apparatus of claim 13, wherein said pump pulses the liquid at a frequency of between approximately one and ten pulses per second.

16. For use in association with a nuclear vessel having a threaded bore therein and a threaded stud threadably engaging the bore, the stud resisting rotation thereof, a method of reducing the resistance of the stud to rotation, comprising the step of vibrating the stud by supplying a pulsating fluid into the bore.

17. The method of claim 16, wherein said step of supplying a pulsating fluid into the bore comprises the step of pulsating the fluid at a frequency of between approximately one and ten pulses per second.

18. The method of claim 16, further comprising the step of suctioning the fluid from the bore.

19. For use in association with a nuclear reactor pressure vessel having a vertically-oriented blind bore therein having first threads and defining a cavity at a proximal end of the bore, the bore receiving an upright elongate stud having second threads threadably engaging the first threads and having a proximal end thereof disposed adjacent the cavity, the first threads and the second threads having debris residing therebetween resisting rotation of the stud in the bore, the stud having a predetermined weight and a centrally disposed passage longitudinally therethrough in communication with the cavity, a method of reducing the resistance of the stud to rotation, comprising the step of lifting the weight of the second threads of the stud from the first threads of the bore by supplying a pulsating liquid into the passage and to the cavity, the liquid exerting an upwardly-directed hydraulic force against the proximal end of the stud lifting the stud as the liquid is pulsated, the liquid migrating between the first threads and the second threads to loosen the debris as the stud is lifted, so that the stud is capable of being rotated with reduced resistance to rotation as the stud is lifted and as the debris loosens.

20. The method of claim 19, further comprising the step of suctioning the liquid for the bore by operating a suction pump in communication with the bore.

21. The method of claim 19, further comprising the step of controllably operating the pump by operating a controller connected to the pump.

22. The method of claim 19, further comprising the step of rotating the stud as the debris loosens.

23. The method of claim 19, wherein said step of lifting the stud comprises the step of pulsing the liquid at a frequency of between one and ten pulses per second.

* * * * *